United States Patent [19]
Novotny et al.

[11] Patent Number: 5,238,668
[45] Date of Patent: Aug. 24, 1993

[54] PROCESS FOR PRODUCTION OF POTASSIUM SILICATE SOLUTIONS BY THE ADDITION OF TEMPERED QUARTZ TO HYDROTHERMALLY REACTED QUARTZ AND KOH, AND HYDROTHERMAL REACTION THEREOF

[75] Inventors: Rudolf Novotny, Duesseldorf; Alfred Hoff, Moers-Schwafheim; Jost Schuertz, Solingen, all of Fed. Rep. of Germany

[73] Assignee: Henkel Kommanditgesellschaft auf Aktien, Duesseldorf, Fed. Rep. of Germany

[21] Appl. No.: 859,422

[22] PCT Filed: Nov. 14, 1990

[86] PCT No.: PCT/EP90/01948
§ 371 Date: May 26, 1992
§ 102(e) Date: May 26, 1992

[87] PCT Pub. No.: WO91/08170
PCT Pub. Date: Jun. 13, 1991

[30] Foreign Application Priority Data

Nov. 23, 1989 [DE] Fed. Rep. of Germany ....... 3938789

[51] Int. Cl.⁵ .............................................. C01B 33/32
[52] U.S. Cl. ...................................... 423/333; 423/332
[58] Field of Search ....................... 423/334, 333, 332

[56] References Cited

U.S. PATENT DOCUMENTS 3,956,467  5/1976  Bertorelli ..................... 423/332
4,770,866  9/1988  Christophliemk .............. 423/334
5,000,933  3/1991  Novotny et al. ............... 423/334
5,084,262  1/1992  Novotny et al. ............... 423/333

FOREIGN PATENT DOCUMENTS 0164073  12/1985  European Pat. Off. .
3423945  1/1986   Fed. Rep. of Germany .
2054546  2/1981   United Kingdom .

Primary Examiner—Olik Chaudhuri
Assistant Examiner—Ken Horton
Attorney, Agent, or Firm—Ernest G. Szoke; Wayne C. Jaeschke; Norvell E. Wisdom, Jr.

[57] ABSTRACT

A process is disclosed for the hydrothermal production of potassium silicate solutions with high $SiO_2:K_2O$ molar ratios, by the hydrothermal reaction of quartz sand with aqueous potassium hydroxide solutions at temperatures in the range of 150° to 300° C. at the pressures of saturated water vapor corresponding to these temperatures in a pressure reactor, which is characterized in that the potassium silicate solutions obtained thereby, which have $SiO_2:K_2O$ molar ratios of less than 2.75:1, are then reacted with a quartz tempered at temperatures in the range of over 1100° C. up to melting point, the temperatures and pressures also being maintained in the ranges named.

20 Claims, No Drawings

PROCESS FOR PRODUCTION OF POTASSIUM SILICATE SOLUTIONS BY THE ADDITION OF TEMPERED QUARTZ TO HYDROTHERMALLY REACTED QUARTZ AND KOH, AND HYDROTHERMAL REACTION THEREOF

FIELD OF THE INVENTION

The present invention relates to a process for the hydrothermal production of potassium silicate solutions with a high $SiO_2:K_2O$ molar ratio by the reaction of quartz sand with aqueous potassium hydroxide solutions to form a potassium silicate solution and with subsequent reaction of this intermediate product with a further crystalline $SiO_2$—variant to form a product with a high $SiO_2:K_2O$ ratio.

STATEMENT OF RELATED ART

A general overview of the production of aqueous potassium silicate solutions is given in the monographs of Winnacker and Kuechler, *Chemische Technologie*, volume 3, *Anorganische Technologie II*, 4th. edition, 1983, p. 54–63 and *Ullmanns Encyklopaedie der technischen Chemie*, Volume 21, 4th. edition, 1982, p. 409–412.

Of the alkali metal silicates known by the term "water glass", potassium silicate solutions—generally known as potassium water glass—are used among others for technical purposes. Such potassium water glasses usually have a solids content of about 28 to 55% by weight and also a molar ratio of silicon dioxide to potassium oxide of 2.0 to 4.2:1. Potassium water glasses are generally produced on an industrial scale by melting together quartz sand and potassium carbonate in suitable furnaces (tank furnaces/rotary kilns) at temperatures in the range of 1400° to 1500° C. with the splitting-off of carbon dioxide. The melt which hardens on cooling, the solid glass, is then dissolved in water in a further process stage using pressure and elevated temperatures and the solution obtained is optionally filtered, depending on the quality requirement.

This high-temperature melt process is, however, very costly both in equipment and as regards the amounts of energy required and leads moreover to not inconsiderable emissions, such as dust, nitrogen oxides, and sulfur oxides.

In addition to these high-temperature melt processes which are the ones mainly used in industry, there are also known hydrothermal processes for the production of aqueous potassium silicate solutions that are described in a number of patent applications.

These processes start from amorphous silicon dioxide, essentially therefore from flue dusts and naturally occurring amorphous silicon dioxide variants.

The products obtained in the process are only of poor quality due to the usual contaminants in the flue dusts and in the natural amorphous silicon dioxide compounds which are used as starting materials, and can therefore be used only to a limited extent for products of high technical value.

DE-AS 28 26 432 relates to a process for the production of water glass solutions by the reaction of flue dusts which occur in the production of silicon or of ferrosilicon alloys with aqueous alkali metal hydroxide solutions at elevated temperatures and subsequent filtration of the solutions obtained, which is characterized in that flue dust is treated in autoclaves with a 6 to 15% by weight aqueous alkali metal hydroxide solution at temperatures of 120° to 90 ° C. and a pressure of 2.9 to 18.6 bars, the weight ratio of alkali metal hydroxide solution to solid flue dust being 2:1 to 5:1. The products of the process have a $SiO_2:K_2O$ molar ratio of 3.76:1. The flue dusts used as starting materials have a silicon content of 89 to 98% by weight, which in the embodiments is always 90% by weight; the rest consists of contaminants.

DE-OS 26 09 831 relates to a process for the conversion of silicon dioxide containing, environment polluting exhaust flue dusts from the production of silicon metal and silicon alloys to form silicic acids or silicates, which is characterized in that the following process stages I to III are combined:

I dissolution of the flue dusts in alkali hydroxide solutions with the formation of alkali silicate solutions;

II purification of the alkali silicate solutions by removal of organic constituents by treatment with activated charcoal and/or oxidation agents and separation of the non-dissoluble residue from the solution;

III reaction of the alkali silicate solutions with inorganic or organic acids and/or their salts for the purposes of further purification.

The alkali silicate solutions obtained in this way generally have a $SiO_2:Me_2O$ molar ratio in the range of 3.3 to 5.0:1.

DE-OS 26 19 604 relates to a process for the production of fluid water glass from amorphous silicon dioxide and alkali hydroxide, which is characterized in that silicon dioxide dust in the form of fly ash, which has been separated off from the waste gases of ferro-alloy industries and other industries working with silicon furnaces, alkali hydroxide and water are mixed in a set weight ratio and then brought under stirring to a temperature between 75° and 100° C., after which the resultant fluid is cooled. The silicon dioxide dusts used as starting material for this water glass production generally have a silicon dioxide content of 94 to 98% by weight; the rest consists of contaminants. The potassium water glass obtained has a $SiO_2/K_2O$ molar ratio of 3.58:1.

As the above shows, the water glasses obtained from amorphous silicon dioxide as described in the patent literature always provide directly only products with inferior properties, which must be subjected to a further purification.

The state of the art described below relates to processes for the hydrothermal production of potassium silicate solutions from crystalline silicon dioxide, thus sand, and potash lye, which according to the processes of the state of the art can, however, be reacted only up to a $SiO_2:K_2O$ molar ratio of up to 2.75:1.

DE-OS 33 13 814 relates inter alia to a process for the production of a clear solution of a potassium silicate, of which the silicon dioxide:potassium oxide molar ratio is 2.75:1, by the dissolution of crystalline silicon dioxide with an average particle size between 0.1 and 2 mm, in which process an aqueous solution of potassium hydroxide passes through a bed of silicon dioxide that is formed in a vertical tubular reactor without mechanical motion and is fed from the top downwards with silicon dioxide and the aqueous solution of the potassium hydroxide.

Belgian patent specification 649 739 relates to a process and a device for the production of clear sodium silicate lixiviums by the dissolution of a silicic acid containing material at high temperature and under pressure in aqueous caustic soda solution, which is characterized in that the product is separated from the excess silicic acid containing material and/or from the insoluble contaminated substances by means of filtering elements, which are fitted close to the reactor floor, the said filtration advantageously taking place under temperature and pressure conditions which are very similar to the reaction conditions. Aqueous potassium silicate solutions are also to be obtained in this way.

Such hydrothermal processes for the production of potassium water glasses from sand and potash lye are also discussed in the monograph of Winnacker, Kuechler already discussed above. It states therein, (pages 61 and 62), that potassium water glasses cannot, however, be produced in the hydrothermal process because during decomposition large quantities of poorly soluble $(KHSi_2O_5)_x$ form which do not dissolve even under subsequent heating.

On the basis of the literature cited above, there was consequently a direct prejudice regarding the production of potassium silicate solutions with a higher $SiO_2/K_2O$ molar ratio in the hydrothermal process from sand, i.e. from crystalline $SiO_2$ and potash lye.

DESCRIPTION OF THE INVENTION

Object of the Invention

The aim of the present invention is therefore to provide a process for the hydrothermal production of potassium silicate solutions by the reaction of crystalline silicon dioxide with aqueous potassium hydroxide solution, in which, as the crystalline silicon dioxide, quartz, i.e. sand, is used inter alia and in which potassium silicate solutions with $SiO_2/K_2O$ molar ratios of more than 2.75:1 are obtained.

Summary of the Invention

The aim of the invention is achieved by the hydrothermal reaction of quartz, i.e. sand, with aqueous potassium hydroxide solutions and the subsequent hydrothermal reaction of the potassium silicate solutions obtained as intermediate product therein with a specially tempered quartz.

The present invention therefore relates to a process for the hydrothermal production of potassium silicate solutions with high $SiO_2:K_2O$ molar ratios by the reaction of quartz sand with aqueous potassium hydroxide solutions at temperatures in the range of 150° to 300° C. and at the pressures of saturated water vapor corresponding to these temperatures in a pressure reactor, which is characterized in that the potassium silicate solutions obtained therein as intermediate product, which have $SiO_2:K_2O$ molar ratios of less than 2.75:1, are then reacted, at temperatures and pressures also kept in the ranges named, with a quartz tempered at temperatures in the range of over 1100° C. up to the melting point.

The process according to the invention, due to its easy process control, involves fewer industrial handling problems and thus is more economical than the process of the state of the art, i.e. the high-temperature melt process with subsequent dissolution stage, which is technically costly, requires large quantities of energy and has a highly polluting effect on the environment.

The process according to the invention has the advantage over the hydrothermal processes of the state of the art that by the use of the specially tempered quartz as the crystalline silicon dioxide component in the subsequent process stage, potassium silicate solutions with $SiO_2:K_2O$ molar ratios of more than 2.75:1 are also obtained, which, as discussed above, was hitherto not possible using quartz, i.e. sand, in the hydrothermal process of the state of the art.

It was, furthermore, surprisingly found that using tempered quartz as the silicon dioxide component and a potassium silicate solution, direct production of aqueous potassium silicate solutions as end product is possible within the framework of a hydrothermal synthesis under the conditions given above even with short reaction times, the solutions having a $SiO_2:K_2O$ molar ratio of more than 2.75:1.

Finally, a particular advantage of the process according to the invention is that in a technically simple and very economical way, potassium silicate solutions with high silicon dioxide/potassium oxide molar ratios are obtained, the procedure for the base reaction, that is the reaction of quartz (sand) with aqueous potassium hydroxide solutions, being such that the more economical silicon dioxide component, that is, sand, can be used first and the more costly crystalline silicon dioxide component obtained by tempering quartz is used only for a "silicification reaction". In this way, by adding the tempered quartz as the crystalline silicon dioxide component, depending on the added amount of tempered quartz, potassium silicate solutions with a $SiO_2:K_2O$ molar ratio of 2.75 to 4.2:1, preferably 3.0 to 4.0:1, can be produced from a potassium silicate solution with a $SiO_2:K_2O$ molar ratio of less than 2.75:1.

DESCRIPTION OF PREFERRED EMBODIMENTS

The potassium silicate solutions obtained initially as the intermediate product in the hydrothermal reaction of quartz, i.e. sand, with potassium hydroxide solutions can be obtained in a manner known per se according to any corresponding process of the prior art. For the purposes of the present invention it is preferred to react quartz sand with aqueous potassium hydroxide solution in a concentration range of 10 to 50% by weight, particularly 15 to 30% by weight, in a pressure reactor, such that temperatures in the range of 150° to 300° C., particularly in the range of 200° to 250° C., and also the pressures of saturated water vapor corresponding to these temperatures are maintained.

The potassium silicate solutions obtained in this way have $SiO_2:K_2O$ molar ratios of less than 2.75:1 and generally solids concentrations in the range of 20 to 55%. For the purposes of the invention, potassium silicate solutions that have solids concentrations in the range of 23 to 40%, particularly from 30 to 38%, are preferred as the intermediate product.

According to a preferred embodiment of the present invention, the potassium silicate solutions obtained as intermediate product—as described above—are then reacted within the framework of the hydrothermal synthesis under the conditions indicated above with a quartz that has been tempered at temperatures in the range of 1100° to 1700° C. with the addition of catalytically active quantities of alkali (e.g. $K_2CO_3/KOH$), the quartz under these temperature conditions converting essentially into cristobalite.

Cristobalite, like quartz, is a crystal variant of silicon dioxide. It is produced almost exclusively synthetically by the calcination of quartz, quartz sand being continuously converted at temperatures of about 1500° C. with the addition of catalysts (alkali compounds). The alkali constituents added to the quartz are present in the form of alkali silicates in the cristobalite following the thermal treatment of the quartz/alkali mixture.

Reference is made to *Ullmanns Encyklopaedie der technischen Chemie*, Volume 21, 4th. edition, 1982, pages 439 to 442 for more detailed information.

For the purposes of the invention, it is therefore particularly preferred to use a quartz tempered at temperatures in the range of 1300° to 1600° C. with the addition of catalytically active quantities of alkali, which under these tempering conditions converts essentially into cristobalite. It is also particularly advantageous to use a freshly tempered, still hot cristobalite material for the process according to the invention.

As regards the quantities of tempered quartz, i.e. in particular of cristobalite, which are added to the potassium silicate solutions formed as intermediate product, the following applies: In general the stoichiometrically required quantity of cristobalite, relative to the desired $SiO_2:K_2O$ molar ratio in the potassium silicate solution sought as the end product, can be added. However, excesses of up to 100% of cristobalite, again relative to the target $SiO_2:K_2O$ ratio in the end product sought, can also be used. In general the reaction can also be carried out with higher excesses than 100% of cristobalite; this is not however generally sensible technically. For the purposes of the invention it is particularly preferred to carry out the hydrothermal reaction with an excess of 0 to 25% of tempered quartz, i.e. particularly cristobalite, relative to the desired $SiO_2:K_2O$ molar ratio in the end product.

According to another preferred embodiment of the present invention, the hydrothermal production of the potassium silicate solutions with a high $SiO_2:K_2O$ molar ratio sought as the end product is carried out in the following way: First, quartz sand and aqueous potassium hydroxide solution (potash lye) are reacted at a certain temperature and pressure level in the pressure reactor. The tempered quartz, i.e. in particular the cristobalite, which is to be added to the potassium silicate solution formed here as an intermediate product, is brought to the same temperature and pressure level and thus purified in the pressure reactor with the potassium silicate solution present therein. Following this, the hydrothermal synthesis is continued under the same temperature and pressure conditions until the target $SiO_2:K_2O$ molar ratio in the range of 2.75 to 4.20:1 of the end product is reached.

Alternatively, after the first stage of the process has been carried out, the pressure vessel can first be pressure-relieved and left to cool to a practicable working temperature, then the cristobalite, optionally also preheated, can be fed into the pressure vessel and, after restoration of the desired temperature and pressure conditions, the hydrothermal synthesis can be continued to its end. Compared with this the preferred process procedure described above, which can practically be termed a one-step process in view of the constant temperature and pressure conditions in the hydrothermal synthesis, has particular economic advantages as regards high space/time yields with minimum energy consumption.

In general all the usual reactors for the hydrothermal synthesis of alkali silicates can be used to carry out the process according to the invention. These include, e.g. rotating dissolvers, stationary dissolver arrangements, reactors with stirrers, jet-agitated loop reactors, tube reactors, and in principle all reactors which are suitable for the reaction of solids with fluids under pressure.

Such reactors are described fully in, for example, DE OS 30 02 857, DE OS 34 21 158, DE AS 28 26 432, BE-PS 649 739, DE-OS 33 13 814 and DE PS 968 034.

To carry out the "one-step" process variant described above, a suitable separate pressure vessel is necessary in which the tempered quartz (cristobalite) which is to be added to the potassium silicate solution formed as intermediate product can be brought to the desired temperature and pressure level. This separate pressure vessel is either directly connected to the actual reactor by corresponding lines provided with shutoff devices or—e.g. in the case of rotating reactors—is connected to the actual reactor via corresponding lines, if required. The necessary devices and fittings required here are also known to one skilled in the art.

The end product—the potassium silicate solution with a high $SiO_2:K_2O$ molar ratio—is released from the pressure reactor into a receiving vessel and can be subjected to an additional filtration for purification. All filter devices known to one skilled in the art for the filtration of alkali silicate solutions can be used here.

The potassium silicate solutions (potassium water glass solutions) produced in the manner of the invention can be used for all the usual applications known to one skilled in the art and described in the relevant literature, for example, as adhesives, as binding agents in paints, auxiliary agents in foundries, welding electrodes, paper manufacture, catalyst carriers, as components in washing and cleaning agents, and also as constituents for fire-resistant materials.

The invention is explained in more detail by the following examples, but is not limited thereto. The abbreviation "HT-process" is alternatively used for "hydrothermal process" in the examples.

In the embodiments a cristobalite obtained by tempering at 1300° to 1600° C. with alkali catalysis was used as the tempered quartz.

A horizontal nickel-lined cylindrical steel pressure vessel with a volume of about 0.5 liter was used to conduct the tests. The pressure vessel rotated at a speed of about 60 revolutions per minute about its horizontal axis. It was heated from outside via a heat transfer medium heated to reaction temperature.

Potassium silicate solutions with a $SiO_2:K_2O$ molar ratio of 2.0 were produced from sand and potash lye and then poured into the pressure reactor with the addition of cristobalite and reacted at 215° or 225° C. and reaction times between 20 and 120 min to form potassium silicate solutions with a $SiO_2:K_2O$ molar ratio of 2.75 to 4.20:1.

Details of this can be seen in the following Examples 1 to 8. Example 3 relates to the production of a potassium silicate solution with a $SiO_2:K_2O$ molar ratio of 2.0:1, Examples 5 to 8 relate to the reaction of such a "base" potassium silicate solution, i.e. one with $SiO_2:K_2O$ molar ratios <2.75:1, with cristobalite.

In a particularly economical form, the process for the production of the base potassium silicate solution with a molar ratio <2.75:1 can be directly combined with the associated reaction of the conversion of this potassium silicate solution with the addition of cristobalite to form the potassium silicate solution, desired as end product, with a $SiO_2:K_2O$ molar ratio of 2.75 to 4.2:1. The course of this process is described below.

The quantities of the substances (sand or cristobalite and potash lye) are determined by means of weighing devices. The raw materials, sand and potash lye, are poured into the reactor, which is then sealed and set in rotation. The reaction mixture is then heated to a reaction temperature of about 215° C. and left at this temperature. After a reaction time of 30 min at this temperature the reactor is brought to a halt.

From a pressure vessel, filled with tempered quartz (cristobalite), which is then flange-mounted on to the reactor and is brought to the same pressure as the reaction vessel, the required quantity of cristobalite is dispensed into the reactor, which contains the previously formed potassium silicate solution with a $SiO_2:K_2O$ molar ratio of about 2.0:1. The pressurized storage vessel is then reclosed, pressure-relieved and separated from the reactor. The quantity of cristobalite added corresponds to the additional $SiO_2$ proportion which is required to achieve a $SiO_2:K_2O$ molar ratio of 4.0:1 in the potassium silicate solution sought as end product. Then the reactor is left for a further 15 to 60 min at reaction temperature. The processing of the potassium silicate solution can then be carried out subsequently either by means of a sedimentation process for separating off solids or—if the requirements for the clarity of the solution are higher—by means of a filter.

It is, however, fundamentally possible to transfer the pressurized fluid phase of the potassium silicate solution into a second, optionally pre-heated reaction vessel in which the calculated quantity of cristobalite has been placed, and to carry the reaction to its end there.

In a particular embodiment, the hydrothermal process can also take place with relatively high solids concentrations in the reactor, since under reaction conditions, for example, 215° C. and 20 bars, the potassium silicate solution in the reactor has an adequate viscosity range for the process. After the end of the reaction, water can be additionally be introduced either
 under pressure directly into the reactor or
 into the blow-off pipe to a receiving tank during the blow-off procedure,
so that the potassium silicate solution coming into the receiving tank via the blow-off pipe is thus sufficiently diluted so that in the receiver at temperatures of about 100° C. the potassium silicate solution has a flowable, sufficiently low-viscosity consistency before further processing by sedimentation/filtration.

EXAMPLES 1 to 4

These examples relate to the production of a "base" potassium silicate solution, which is used as a starting material for the further reaction with tempered quartz.

Amounts of 49 g of sand and 87.06 g of a 25% by weight potash lye were poured into the horizontal cylindrical pressure vessel and the latter was sealed pressure tight. After reaction times of respectively 15, 30, 60 and 120 min at 215° C./20 bar the reactor was cooled and the potassium silicate solution formed was analyzed. It had the following $SiO_2:K_2O$ molar ratios (Table 1).

TABLE 1

| Test No. | React. temp. °C. | React. time, min | In Solution % $SiO_2$ | % $K_2O$ | Mol Ratio $SiO_2:K_2O$ |
|---|---|---|---|---|---|
| 1 | 215 | 15 | 6.44 | 19.64 | 0.51 |
| 2 | 215 | 30 | 12.32 | 18.40 | 1.05 |
| 3 | 215 | 60 | 21.34 | 16.62 | 2.02 |
| 4 | 215 | 120 | 25.03 | 15.72 | 2.50 |

The potassium silicate solution from Example 3 was reacted further with cristobalite, as is indicated in more detail in Examples 5 to 8 in Table 2.

Here the required additional quantity of cristobalite was added to the potassium silicate solution to achieve a $SiO_2:K_2O$ molar ratio of 4.0. In addition, a cristobalite excess of 10%, relative to the target ratio of 4.0, was added.

Examples 5 to 7 and in particular 8 show that the reaction of potassium silicate solutions with a $SiO_2:K_2O$ molar ratio <2.0:1 with the tempered crystalline $SiO_2$ components leads to potassium silicate solutions with $SiO_2:K_2O$ molar ratios between 3.6 and 4.0:1, even with short reaction times (30 min.) and relatively low reaction temperatures (<230° C.).

TABLE 2

| Test No. | React. temp. °C. | React. time min | In Solution % $SiO_2$ | % $K_2O$ | Wt. Ratio $SiO_2:K_2O$ | Mol. Ratio $SiO_2:K_2O$ |
|---|---|---|---|---|---|---|
| 5 | 215 | 15 | 28.30 | 14.40 | 1.96 | 3.06 |
| 6 | 215 | 30 | 33.00 | 14.32 | 2.31 | 3.61 |
| 7 | 215 | 60 | 32.00 | 12.94 | 2.46 | 3.89 |
| 8 | 225 | 30 | 35.80 | 14.00 | 2.56 | 4.00 |

What is claimed:

1. A process comprising steps of:
 (A) hydrothermal reaction of quartz sand with aqueous potassium hydroxide solutions at temperatures in the range of 150° to 300° C. and the pressures of saturated water vapor corresponding to these temperatures in a pressure reactor to produce a potassium silicate solution which has an $SiO_2:K_2O$ molar ratio of less than 2.75:1, and
 (B) hydrothermally reacting, at the temperatures and pressures within the same range as recited in step (A), the solutions from step (A) with a quartz tempered at temperatures in the range of over 1100° C. up to melting point of the quartz.

2. A process according to claim 1, wherein the potassium silicate solution obtained as the end product has a $SiO_2:K_2O$ molar ratio of 3.0 to 4.0:1.

3. A process according to claim 2, wherein the potassium silicate solution obtained in step (A) is reacted in step (B) with a quartz tempered at temperatures in the range of 1300° to 1600° C., with the addition of catalytically active quantities of alkali.

4. A process according to claim 3, wherein the potassium silicate solution obtained in step (A) is reacted in step (B) with the stoichiometrically required quantity of tempered quartz, relative to the desired $SiO_2:K_2O$ molar ratio in the end product.

5. A process according to claim 3, wherein the potassium silicate solution obtained in step (A) is reacted in step (B) with an excess of up to 100% of tempered quartz, relative to the desired $SiO_2:K_2O$ molar ratio in the end product.

6. A process according to claim 3, wherein the potassium silicate solution obtained in step (A) is reacted in step (B) with an excess of up to 25% of tempered quartz, relative to the desired $SiO_2:K_2O$ molar ratio in the end product.

7. A process according to claim 6, wherein the hydrothermal reactions are carried out at temperatures in the range of 200° to 250° C. and at the pressures of saturated water vapor corresponding to these temperatures.

8. A process according to claim 7, wherein in step (A), quartz sand is reacted with aqueous potassium hydroxide solution of a concentration of 15 to 30% by weight of potassium hydroxide.

9. A process according to claim 8, wherein step (A) is carried out at a certain temperature and pressure level in a pressure reactor, the tempered, still hot quartz to be added is brought to the same temperature and pressure level, the potassium silicate solution formed in step (A) is combined with the tempered quartz, the selected temperature and pressure level being maintained, and then the hydrothermal reaction is continued in step (B) under the same temperature and pressure conditions until the desired $SiO_2:K_2O$ molar ratio in the end product is achieved.

10. A process according to claim 1, wherein the potassium silicate solution obtained as the end product has a $SiO_2:K_2O$ molar ratio of 2.75 to 4.20:1.

11. A process according to claim 1, wherein the potassium silicate solution obtained in step (A) is reacted in step (B) with a quartz tempered at temperatures in the range of 1100° to 1700° C., with the addition of catalytically active quantities of alkali.

12. A process according to claim 10, wherein the potassium silicate solution obtained in step (A) is reacted in step (B) with the stoichiometrically required quantity of tempered quartz, relative to the desired $SiO_2:K_2O$ molar ratio in the end product.

13. A process according to claim 10, wherein the potassium silicate solution obtained in step (A) is reacted in step (B) with an excess of up to 100% of tempered quartz, relative to the desired $SiO_2:K_2O$ molar ratio in the end product.

14. A process according to claim 10, wherein the potassium silicate solution obtained in step (A) is reacted in step (B) with an excess of up to 25% of tempered quartz, relative to the desired $SiO_2:K_2O$ molar ratio in the end product.

15. A process according to claim 10, wherein the potassium silicate solution obtained in step (A) is reacted in step (B) with an excess of up to 25% of tempered quartz, relative to the desired $SiO_2:K_2O$ molar ratio in the end product.

16. A process according to claim 10, wherein the potassium silicate solution obtained in step (A) is reacted in step (B) with an excess of up to 25% of tempered quartz, relative to the desired $SiO_2:K_2O$ molar ratio in the end product.

17. A process according to claim 2, wherein the potassium silicate solution obtained in step (A) is reacted in step (B) with an excess of up to 25% of tempered quartz, relative to the desired $SiO_2:K_2O$ molar ratio in the end product.

18. A process according to claim 1, wherein the hydrothermal reactions are carried out at temperatures in the range of 200° to 250° C. and at the pressures of saturated water vapor corresponding to these temperatures.

19. A process according to claim 1, wherein in step (A), quartz sand is reacted with aqueous potassium hydroxide solution of a concentration of 10 to 50% by weight.

20. A process according to claim 10, wherein step (A) is carried out at a certain temperature and pressure level in a pressure reactor, the tempered, still hot quartz to be added is brought to the same temperature and pressure level, the potassium silicate solution formed in step (A) is combined with the tempered quartz, the selected temperature and pressure level being maintained, and then the hydrothermal reaction is continued in step (B) under the same temperature and pressure conditions until the desired $SiO_2:K_2O$ molar ratio in the end product is achieved.

* * * * *